(12) United States Patent
Lee et al.

(10) Patent No.: US 11,581,593 B2
(45) Date of Patent: Feb. 14, 2023

(54) ENERGY STORAGE SYSTEM HAVING STRUCTURE CAPABLE OF DISSIPATING HEAT TO ADJACENT BATTERY MODULES

(71) Applicant: LG CHEM, LTD., Seoul (KR)

(72) Inventors: Jin-Kyu Lee, Daejeon (KR); Soo-Han Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 320 days.

(21) Appl. No.: 17/042,630

(22) PCT Filed: Jan. 3, 2020

(86) PCT No.: PCT/KR2020/000139
§ 371 (c)(1),
(2) Date: Sep. 28, 2020

(87) PCT Pub. No.: WO2020/141943
PCT Pub. Date: Jul. 9, 2020

(65) Prior Publication Data
US 2021/0013560 A1    Jan. 14, 2021

(30) Foreign Application Priority Data
Jan. 4, 2019  (KR) .................. 10-2019-0001421

(51) Int. Cl.
*H01M 10/613*    (2014.01)
*H01M 10/647*    (2014.01)
(Continued)

(52) U.S. Cl.
CPC ....... *H01M 10/613* (2015.04); *H01M 10/647* (2015.04); *H01M 10/653* (2015.04); *H01M 10/6552* (2015.04); *H01M 50/20* (2021.01)

(58) Field of Classification Search
CPC ............ H01M 10/613; H01M 10/647; H01M 10/653; H01M 10/6552; H01M 50/20;
(Continued)

(56) References Cited

U.S. PATENT DOCUMENTS 5,890,606 A * 4/1999 Kuipers .............. H01M 50/204
  211/186
7,323,271 B2 * 1/2008 Marraffa ............. H01M 50/204
  429/100

(Continued)

FOREIGN PATENT DOCUMENTS

CN    204067456 U  * 12/2014
CN    105742531 A  *  7/2016 .............. B60L 50/66
(Continued)

OTHER PUBLICATIONS

International Search Report (PCT/ISA/210) issued in PCT/KR2020/000139, dated Apr. 16, 2020.
(Continued)

*Primary Examiner* — Kaity V Chandler
(74) *Attorney, Agent, or Firm* — Birch, Stewart, Kolasch & Birch, LLP (57) ABSTRACT

An energy storage system includes a pair of rack frames spaced apart from each other and arranged side by side; a plurality of L brackets fastened to the rack frames; a plurality of battery modules respectively placed on a pair of L brackets facing each other to form a plurality of layers along a longitudinal direction of the rack frame; a first heat transfer member interposed between the battery module and the L bracket; and a second heat transfer member interposed between the rack frame and the L bracket.

12 Claims, 5 Drawing Sheets

(51) Int. Cl.
  *H01M 10/653* (2014.01)
  *H01M 10/6552* (2014.01)
  *H01M 50/20* (2021.01)

(58) Field of Classification Search
  CPC .......... H01M 10/6551; H01M 10/617; H01M 50/204; H01M 50/262; H01M 10/655; H01M 10/627; H01M 10/659; H01M 50/24; H01M 2220/10; Y02E 60/10
  See application file for complete search history.

(56) References Cited

U.S. PATENT DOCUMENTS

| | | | | |
|---|---|---|---|---|
| 2002/0179552 | A1* | 12/2002 | Marraffa | H01M 50/204 211/186 |
| 2004/0035807 | A1* | 2/2004 | Marraffa | H01M 50/224 211/186 |
| 2005/0058891 | A1* | 3/2005 | Marraffa | H01M 50/262 429/100 |
| 2005/0084748 | A1* | 4/2005 | Miller | H04Q 1/035 211/13.1 |
| 2005/0242774 | A1* | 11/2005 | Marraffa | H04Q 1/035 361/730 |
| 2005/0281002 | A1* | 12/2005 | Miller | H01M 10/613 361/716 |
| 2006/0028171 | A1* | 2/2006 | Marraffa | H01M 50/209 320/107 |
| 2006/0152906 | A1* | 7/2006 | Miller | H01M 10/6562 361/716 |
| 2011/0189525 | A1 | 8/2011 | Palanchon et al. | |
| 2013/0078494 | A1 | 3/2013 | Hermann | |
| 2016/0190528 | A1* | 6/2016 | Conrardy | H05K 7/183 312/351 |
| 2017/0331166 | A1 | 11/2017 | Hasegawa | |
| 2018/0138565 | A1 | 5/2018 | Lee | |
| 2018/0287226 | A1 | 10/2018 | Yoo et al. | |
| 2020/0006821 | A1 | 1/2020 | Oono et al. | |

FOREIGN PATENT DOCUMENTS

| | | | |
|---|---|---|---|
| CN | 205810903 U | 12/2016 | |
| CN | 104823322 B | * 10/2017 | .......... H01M 10/613 |
| CN | 209880674 U | * 12/2019 | |
| JP | 2015-233017 A | 12/2015 | |
| JP | 2016-119216 A | 6/2016 | |
| JP | 6432830 B2 | * 12/2018 | |
| KR | 10-2017-0036639 A | 4/2017 | |
| KR | 10-2017-0070795 A | 6/2017 | |
| KR | 20-2017-0003300 U | 9/2017 | |
| KR | 10-2017-0138204 A | 12/2017 | |
| WO | WO 2017/037999 A1 | 3/2017 | |
| WO | WO 2018/142674 A1 | 8/2018 | |

OTHER PUBLICATIONS

Extended Search Report issued in Application No. 20/36094.2, dated Jul. 13, 2021.

* cited by examiner

FIG. 1

Prior Art

ENERGY STORAGE SYSTEM HAVING STRUCTURE CAPABLE OF DISSIPATING HEAT TO ADJACENT BATTERY MODULES

TECHNICAL FIELD

The present disclosure relates to an energy storage system having a structure capable of dissipating heat to adjacent battery modules. More specifically, the present disclosure relates to an energy storage system having a structure capable of preventing heat from being intensively transferred to an adjacent battery module by uniformly transferring heat all battery modules, when an abnormal heat generation symptom occurs in some battery modules among a plurality of battery modules accommodated in a battery rack that accommodates and supports the battery modules.

The present application claims priority to Korean Patent Application No. 10-2019-0001421 filed on Jan. 4, 2019 in the Republic of Korea, the disclosures of which are incorporated herein by reference.

BACKGROUND ART

An existing energy storage system has a cooling system constructed in consideration of a heat generation amount and a safety reference temperature according to the environment in which the energy storage system is used, from the viewpoint of preventing a lifespan from being rapidly shortened due to an increase in temperature during long-term use.

However, in the energy storage system including a plurality of battery modules, despite the presence of the cooling system, some battery modules may cause abnormal heat generation. As described above, when some battery modules cause abnormal heat generation, if the temperature exceeds a certain threshold, a thermal runaway occurs, and thus a safety issue may be generated.

Figure 1:
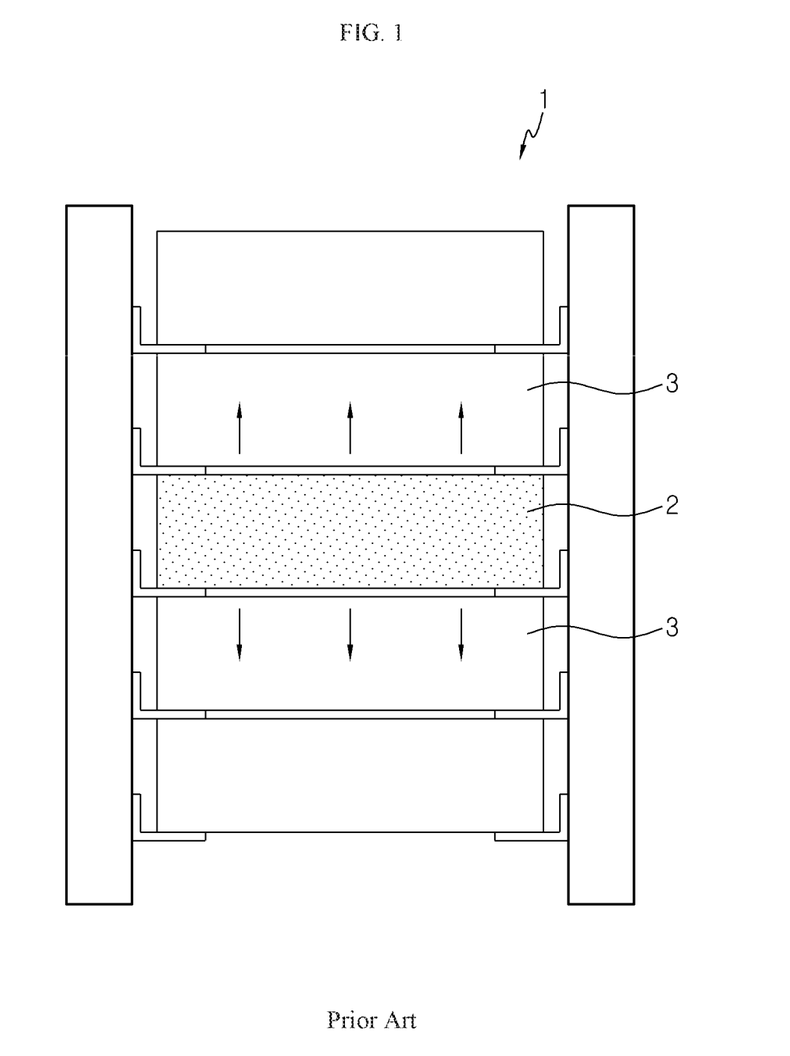
FIG. 1 is a diagram showing a conventional energy storage system.

Referring to FIG. 1, a conventional energy storage system 1 is shown. The conventional energy storage system 1 has a structure in which, for example, when an abnormal heat generation occurs in a battery module 2 located at the center, most of the heat is inevitably concentrated to battery modules 3 adjacent thereto.

In the structure of the conventional energy storage system 1, when a thermal runaway phenomenon occurs in some battery modules, a large amount of heat is propagated to adjacent battery modules within a short period of time, causing a series of thermal runaways, which may lead to a large damage such as large-scale ignition and/or explosion. In particular, if a flame caused by ignition generated in the battery module is discharged to the outside, great human and property damage may occur.

Therefore, it is required to develop an energy storage system having a structure capable of preventing heat from being concentrated in battery modules adjacent to the battery module in which a problem occurs, even though the problem such as thermal runaway caused by abnormal heat generation of some battery modules is generated.

DISCLOSURE

Technical Problem

The present disclosure is designed to solve the problems of the related art, and therefore the present disclosure is directed to providing an energy storage system having a structure capable of preventing heat from being concentrated in battery modules adjacent to the battery module in which a problem occurs, even though the problem such as thermal runaway caused by abnormal heat generation of some battery modules is generated.

However, the technical problem to be solved by the present disclosure is not limited to the above, and other objects not mentioned herein will be understood from the following description by those skilled in the art.

Technical Solution

In one aspect of the present disclosure, there is provided energy storage system, comprising: a pair of rack frames spaced apart from each other and arranged side by side; a plurality of L brackets fastened to the rack frames; a plurality of battery modules, each of the plurality of battery modules respectively placed on a pair of the plurality of L brackets facing each other to form a plurality of layers along a longitudinal direction of the rack frame; a first heat transfer member interposed between each of the plurality of battery modules and each of the plurality of L brackets; and a second heat transfer member interposed between the rack frame and each of the plurality of L brackets.

The first heat transfer member may be a graphite sheet.

The heat transfer sheet may be a graphite sheet.

The second heat transfer member may be a thermal interface material (TIM).

A lower surface and a side surface of the battery module may be in close contact with the L bracket.

An entirety of the side surface of the battery module may be in close contact with the L bracket.

The rack frame may have an accommodation groove configured to accommodate the second heat transfer member and the L bracket.

A surface of a portion of the L bracket inserted into the accommodation groove and a surface of the rack frame may be in a same plane.

The first heat transfer member may be interposed both between the L bracket and the battery module and between the rack frame and the battery module.

Battery modules disposed in adjacent layers may be spaced apart from each other directly and indirectly.

Among a pair of battery modules adjacent to each other, a first battery module located at a lower portion may be in close contact with the L bracket that supports a second battery module located at an upper portion.

A heat blocking member may be interposed between the pair of battery modules.

Advantageous Effects

According to an embodiment of the present disclosure, in an energy storage system including a plurality of battery modules, even though a problem such as thermal runaway caused by abnormal heat generation of some battery modules is generated, it is possible to prevent heat from being concentrated in battery modules adjacent to the battery module in which the problem occurs.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
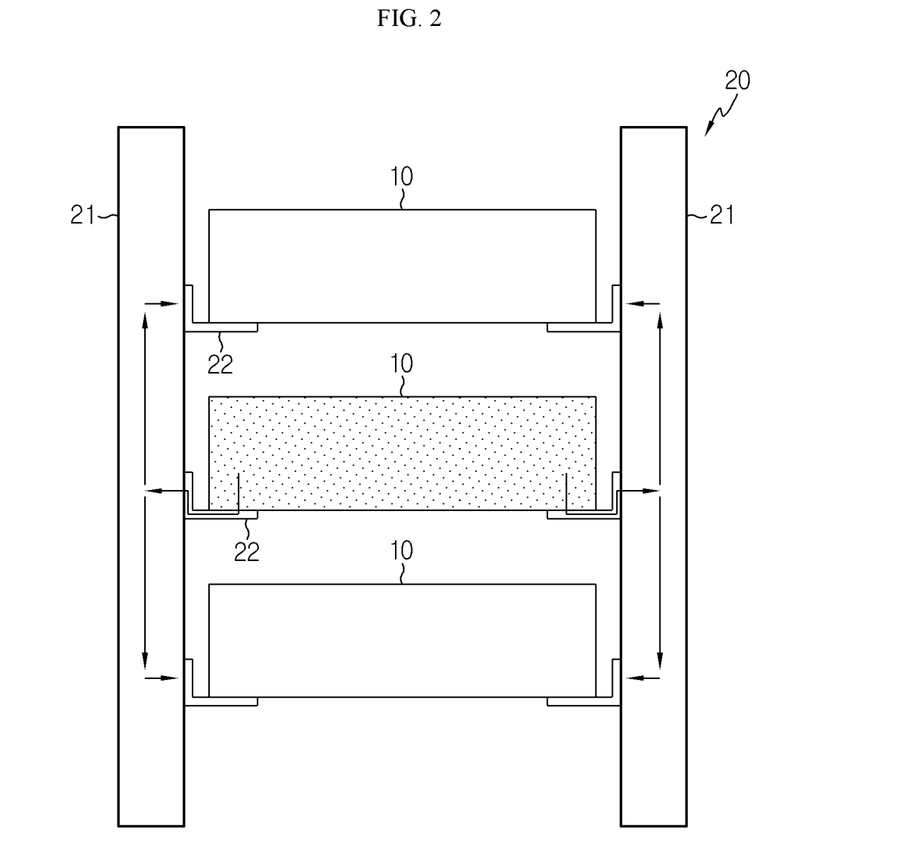
FIG. 2 is a diagram showing an energy storage system according to an embodiment of the present disclosure.
Figure 3:
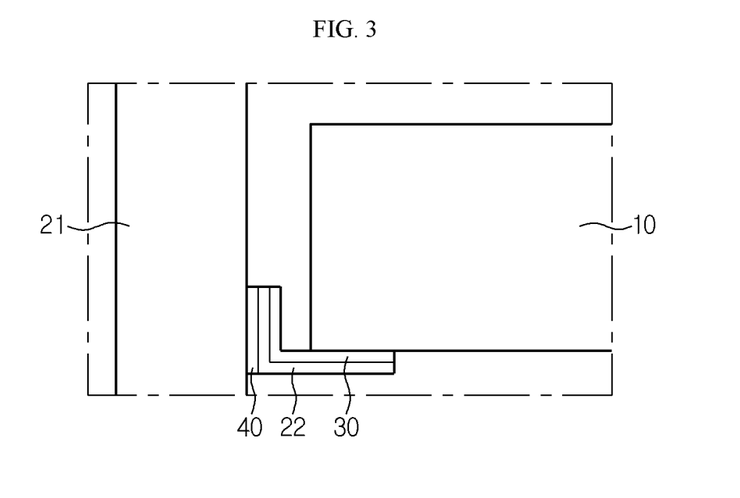
FIGS. 3 to 6 are partially enlarged views showing the energy storage system of FIG. 2.

Referring to FIGS. 2 and 3, an energy storage system according to an embodiment of the present disclosure may be implemented to include a plurality of battery modules 10, a battery rack 20, a first heat transfer member 30 and a second heat transfer member 40.

Although not shown in the figures, the battery module 10 may be implemented to include a plurality of battery cells and a module case accommodating the plurality of battery cells. As a battery cell of the battery module 10, for example, a pouch-type battery cell may be applied. However, the type of the battery cell applied to the present disclosure is not limited thereto, and various types of battery cells such as rectangular cells and cylindrical cells may be applied without limitation as long as they correspond to a secondary battery that may be charged and discharged.

In addition, the plurality of battery cells included in the battery module 10 may be electrically connected to each other in series, in parallel, or in a mixed way. The battery module 10 may be provided in a substantially rectangular parallelepiped shape so as to be easily stacked in the battery rack 20 and maximize energy density during stacking. That is, the module case of the battery module 10 may have a substantially rectangular parallelepiped shape and may be made of, for example, a metal material such as aluminum for easy heat transfer, as will be described later.

The battery rack 20 accommodates a plurality of battery modules 10 in a space formed therein, and may be implemented to include a pair of rack frames 21 and an L bracket 22.

The pair of rack frames 21 are spaced apart from each other with a greater interval than the width of the battery module 10 and placed side by side. As explained later, the rack frame 21 should be able to transfer heat of the battery module 10, which is a starting point of heat and/or ignition, well along a longitudinal direction of the rack frame 21 in order to prevent thermal runaway from rapidly expanding from some battery module 10 to adjacent battery modules.

In consideration of the function of the rack frame 21, the rack frame 21 may be made of a metal material, for example aluminum or steel, which has excellent conductivity and a certain level of rigidity.

The L bracket 22 is a bracket having an approximately L shape. The L bracket is fastened by bolting or the like on the facing surfaces of the pair of rack frames 21, and a plurality of L brackets 22 are provided to be spaced apart by a predetermined distance along the longitudinal direction of the rack frame 21. In this case, the distance between the pair of L brackets 22 adjacent to each other in a vertical direction is determined in consideration of the height of the battery module 10 (a vertical length based on FIG. 2).

Specifically, the distance between the pair of L brackets 22 adjacent to each other in the vertical direction is determined such that the battery modules 10 adjacent to each other do not contact each other and also the battery module 10 located at a lower portion among the pair of battery modules 10 does not contact the L bracket 22 that supports the battery module 10 located at an upper portion. That is, the battery modules 10 disposed in adjacent layers are spaced apart from each other directly and indirectly. This is to prevent heat from being easily transferred between the battery modules 10 adjacent to each other when heat and/or ignition occurs in some battery modules 10.

Since the L bracket 22 is included in a path through which heat generated in some battery modules 10 is dissipated, like the rack frame 21, the L bracket 22 may be made of a material identical or similar to the rack frame 21 for efficient heat transfer.

The pair of L brackets 22, which are respectively fastened to the pair of rack frames 21 and positioned at the same height, support one battery module 10. Accordingly, the battery modules 10 are placed on the L brackets 22 forming different layers to form a plurality of battery module layers along the longitudinal direction of the rack frame 21.

Even though FIG. 2 shows only the case where the L brackets 22 and the battery modules 10 form three layers, the present disclosure is not limited thereto. That is, the L brackets 22 and the battery modules 10 may be provided more than those shown in FIG. 2 to form four or more layers. As more layers are formed in the space formed between the pair of rack frames 21, abnormal heat generated in some battery module 10 may be more easily distributed to a plurality of battery modules 10 located in various layers.

Referring to FIG. 3 along with FIG. 2, the first heat transfer member 30 is interposed between the battery module 10 and the L bracket 22 to absorb heat generated from the battery module 10 and transfer the heat to the L bracket 22 well. Considering the function of the first heat transfer member 30, a heat pipe or a heat transfer sheet may be applied as the first heat transfer member 30. In addition, as the heat transfer sheet, various sheets including materials having excellent thermal conductivity may be applied, and, for example, a graphite sheet may be applied.

The second heat transfer member 40 is interposed between the rack frame 21 and the L bracket 22 to absorb heat generated at the battery module 10 and transferred from the first heat transfer member 30 and the L bracket 22 and transfer the heat to the rack frame 21 well. Considering the function of the second heat transfer member 40, a thermal interface material (TIM) may be applied as the second heat transfer member 40. In addition, as the TIM, various materials having excellent thermal conductivity may be applied, and, for example, a thermal grease may be applied.

The first heat transfer member 30 and the second heat transfer member 40 not only have high thermal conductivity but also maximize a contact area between metal objects, namely a contact area between the surface of the battery module 10 and the L bracket 22 and a contact area between the L bracket 22 and the rack frame 21.

Figure 4:
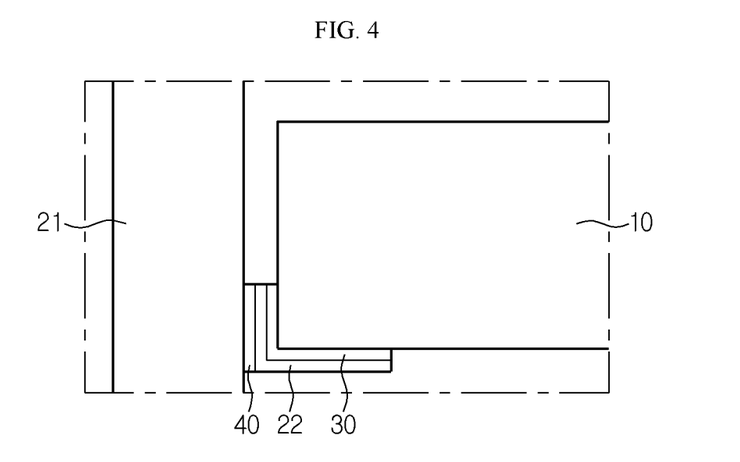

Referring to FIG. 4, the first heat transfer member 30 may contact not only a bottom surface of the battery module 10 but also a side surface thereof, unlike that shown in FIG. 3. That is, the structure as shown in FIG. 3, in which the side surface of the battery module 10 is spaced a certain distance from the first heat transfer member 30, may suffer a loss in terms of heat conduction efficiency and energy density.

Meanwhile, as shown in FIG. 4, if the width of the battery module 10 is extended so that the side surface of the battery module 10 is in contact with the first heat transfer member 30, the total contact area between the first heat transfer member 30 and the battery module 10 is further widened, which is advantageous in terms of thermal conduction efficiency and also increases the volume of the battery module 10 within a defined space to increase the energy density.

Figure 5:
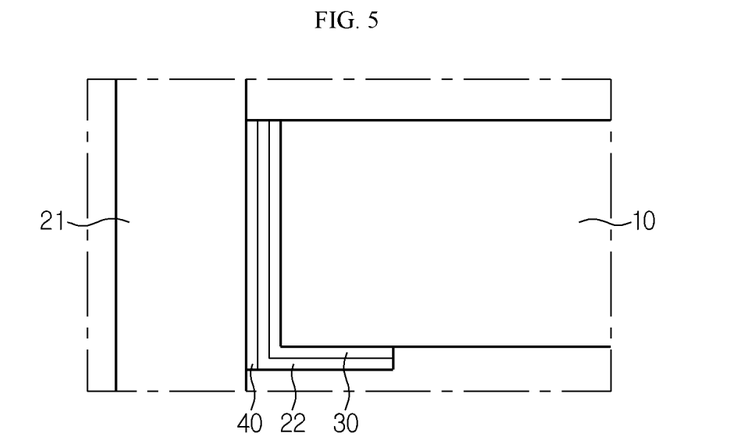

Referring to FIG. 5, the L bracket 22 may be extended to cover the entire side surface of the battery module 10, and accordingly, the first heat transfer member 30 and the second heat transfer member 40 may also be further extended upwards by a length corresponding thereto.

If the L bracket 22, the first heat transfer member 30 and the second heat transfer member 40 have an extended length to cover the entire side surface of the battery module 10, the battery module 10 may be stably supported, and also the heat transfer efficiency may be maximized according to the increase of the contact area.

Figure 6:
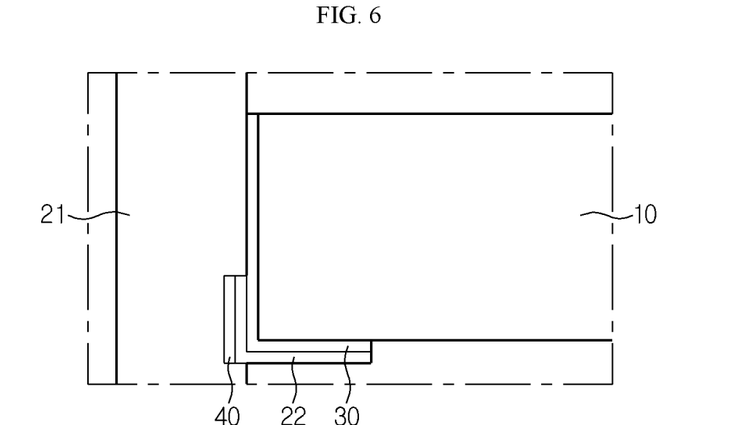

Referring to FIG. 6, the rack frame 21 has an accommodation groove for accommodating the second heat transfer member 40 and the L bracket 22. The L bracket 22 and the second heat transfer member 40 are accommodated in the accommodation groove, whereby the surface of a portion of the L bracket 22 inserted into the accommodation groove and the surface of the rack frame 21 form the same plane.

In addition, the first heat transfer member 30 has an extended length to cover both the surface of the rack frame 21 and the surface of the L bracket 22 forming the same plane. That is, the first heat transfer member 30 is interposed both between the L bracket 22 and the side surface of the battery module 10 and between the rack frame 21 and the side surface of the battery module 10.

If a portion of the L bracket 22 and a portion of the second heat transfer member 40 are accommodated in the accommodation groove formed at the rack frame 21, heat generated from the battery module 10 may be transferred to the rack frame 21 more efficiently.

As described above, the energy storage system according to an embodiment of the present disclosure has a structure forming a plurality of layers in which, when heating and/or ignition occurs in some of the battery modules 10 disposed in the battery rack 20, heat is not directly transferred to adjacent battery modules 10 but the heat absorbed through the rack frame 21 is evenly distributed to the battery modules 10 arranged in several layers. That is, the energy storage system according to an embodiment of the present disclosure has a structure in which heat may be rapidly dissipated along the arrow direction shown in FIG. 2 by applying the L bracket 22 and the heat transfer members 30, 40 made of conductive material, whereby it is possible to prevent the heat runaway from rapidly spreading to battery modules adjacent to the battery module 10 in which heat and/or ignition has occurred.

Next, referring to FIGS. 7 and 8, an energy storage system according to another embodiment of the present disclosure will be described.

The energy storage system according to another embodiment of the present disclosure has a difference in distance between adjacent battery modules 10 compared to the energy storage system according to an embodiment of the present disclosure described above, and a heat blocking member 50 is additionally applied. The other components are substantially the same.

Thus, in describing the energy storage system according to an embodiment of the present disclosure, only a feature that is different from the former embodiment will be intensively described, and a feature identical to the former embodiment will not be described in detail.

Figure 7:
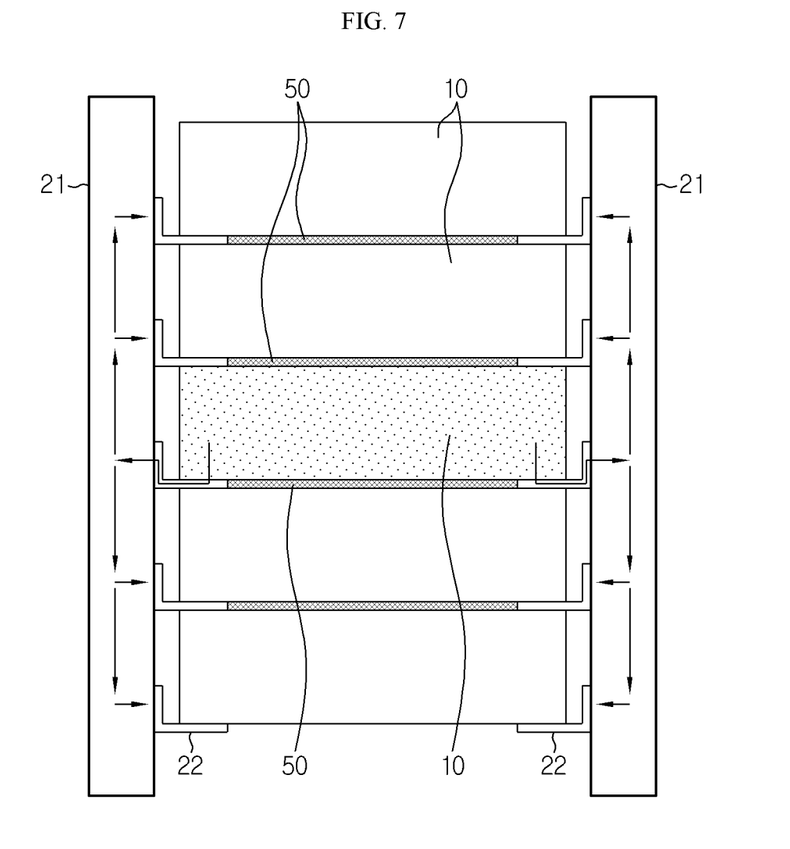
FIG. 7 is a diagram showing an energy storage system according to another embodiment of the present disclosure.
Figure 8:
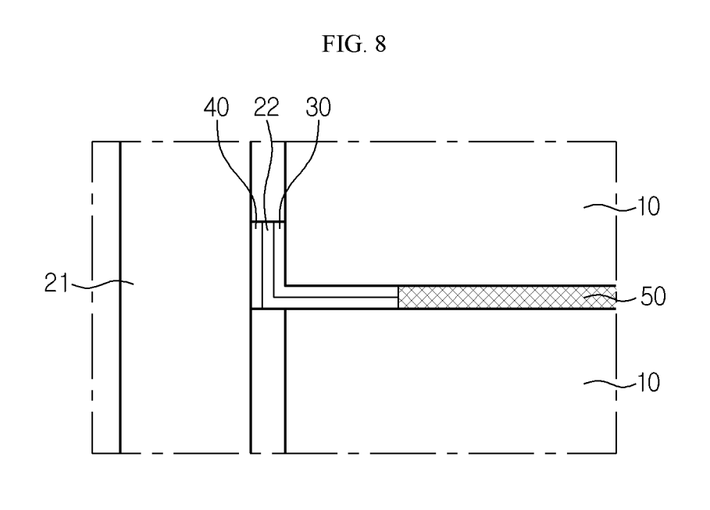
FIG. 8 is a partially enlarged view showing the energy storage system of FIG. 7.

Referring to FIGS. 7 and 8, the energy storage system according to another embodiment of the present disclosure has a structure in which the battery module 10 located at a lower portion among the pair of battery modules 10 adjacent to each other in a vertical direction is in close contact with the L bracket 22 that supports the battery module 10 located at an upper portion. That is, the energy storage system according to another embodiment of the present disclosure has a structure in which the distance between the battery modules 10 arranged up and down to form different layers is minimized in order to improve energy density.

In this case, since the battery modules 10 adjacent to each over in a vertical direction becomes very close to each other, heat may be directly transferred rapid between the battery modules 10. Thus, in order to prevent the rapid heat transfer, a heat blocking member 50 is applied between the battery modules 10 adjacent to each over in a vertical direction. The heat blocking member 50 may employ a conventional heat blocking member made of a vulcanized fiber sheet.

Meanwhile, even though FIGS. 7 and 8 show only the case where the side surface of the battery module 10 is spaced apart from the first heat transfer member 30, the energy storage system according to another embodiment of the present disclosure may also employ the structure of the former embodiment shown in FIGS. 4 to 6.

That is, even in the energy storage system according to another embodiment of the present disclosure, the structure in which the side surface of the battery module 10 is in close contact with the first heat transfer member 30, and/or the structure in which the entire side surface of the battery module 10 is covered by the first heat transfer member 30, and/or the structure in which the second heat transfer member 40 and the L bracket 22 are accommodated in the accommodation groove formed at the rack frame 21 may be applied, as in the former embodiment.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:
1. An energy storage system, comprising:
    a pair of rack frames spaced apart from each other and arranged side by side;
    a plurality of L brackets fastened to the rack frames;
    a plurality of battery modules, each of the plurality of battery modules respectively placed on a pair of the plurality of L brackets facing each other to form a plurality of layers along a longitudinal direction of the rack frame;

a first heat transfer member interposed between each of the plurality of battery modules and each of the plurality of L brackets; and a second heat transfer member interposed between the rack frame and each of the plurality of L brackets.

2. The energy storage system according to claim 1, wherein the first heat transfer member is a heat pipe or a heat transfer sheet.

3. The energy storage system according to claim 2, wherein the first heat transfer member is a graphite sheet.

4. The energy storage system according to claim 1, wherein the second heat transfer member is a thermal interface material (TIM).

5. The energy storage system according to claim 1, wherein a lower surface and a side surface of the battery module are in close contact with the L bracket.

6. The energy storage system according to claim 5, wherein an entirety of the side surface of the battery module is in close contact with the L bracket.

7. The energy storage system according to claim 1, wherein the rack frame has an accommodation groove configured to accommodate the second heat transfer member and the L bracket.

8. The energy storage system according to claim 7, wherein a surface of a portion of the L bracket inserted into the accommodation groove and a surface of the rack frame are in a same plane.

9. The energy storage system according to claim 8, wherein the first heat transfer member is interposed both between the L bracket and the battery module and between the rack frame and the battery module.

10. The energy storage system according to claim 1, wherein battery modules disposed in adjacent layers are spaced apart from each other directly and indirectly.

11. The energy storage system according to claim 1, wherein among a pair of battery modules adjacent to each other, a first battery module located at a lower portion is in close contact with the L bracket that supports a second battery module located at an upper portion.

12. The energy storage system according to claim 11, wherein a heat blocking member is interposed between the pair of battery modules.

* * * * *